US012209921B2

United States Patent
Bastepe-Gray et al.

(10) Patent No.: US 12,209,921 B2
(45) Date of Patent: Jan. 28, 2025

(54) SMART FRETBOARD

(71) Applicant: THE JOHNS HOPKINS UNIVERSITY, Baltimore, MD (US)

(72) Inventors: Serap Bastepe-Gray, Hunt Valley, MD (US); Khanh Nguyen, Baltimore, MD (US); Can Kocabalkanli, Baltimore, MD (US); Zhiyi Ren, Baltimore, MD (US); Chun-Cheng Hsu, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 211 days.

(21) Appl. No.: 17/639,199

(22) PCT Filed: Aug. 31, 2020

(86) PCT No.: PCT/US2020/048740
§ 371 (c)(1),
(2) Date: Feb. 28, 2022

(87) PCT Pub. No.: WO2021/042031
PCT Pub. Date: Mar. 4, 2021

(65) Prior Publication Data
US 2022/0326098 A1 Oct. 13, 2022

Related U.S. Application Data

(60) Provisional application No. 62/893,900, filed on Aug. 30, 2019.

(51) Int. Cl.
*G01L 1/14* (2006.01)
*G09B 15/00* (2006.01)
(Continued)

(52) U.S. Cl.
CPC ............ *G01L 1/146* (2013.01); *G09B 15/003* (2013.01); *G10D 1/08* (2013.01); *G10D 3/06* (2013.01)

(58) Field of Classification Search
CPC ........ G01L 1/146; G09B 15/003; G10D 1/08; G10D 3/06
See application file for complete search history.

(56) References Cited

U.S. PATENT DOCUMENTS 4,468,997 A * 9/1984 Young, Jr. .............. G10H 1/182
984/332
4,630,520 A * 12/1986 Bonanno ................ G10H 1/342
84/723
(Continued)

FOREIGN PATENT DOCUMENTS

| GB | 2178217 A * | 2/1987 | ............. G10H 1/342 |
| JP | 2002258839 A | 9/2002 | |

(Continued)

OTHER PUBLICATIONS

Zhiyi Ren et al. Multi-Contact Force-Sensing Guitar for Training and Therapy Conference: 2019 IEEE Sensors, Oct. 30, 2019.
(Continued)

*Primary Examiner* — Robert W Horn

(57) ABSTRACT

A sensing fretboard for stringed instruments is described herein with respect to a guitar. The present invention includes custom frets and a modular sensing array that can be incorporated into a fretboard and coupled to the guitar. By measuring the dynamic forces applied by the players on the frets and strings of the guitar, musicians can be warned in real time during practice, when their grip is too strong, and to help musicians learn and recover from injuries.

18 Claims, 17 Drawing Sheets

(51) Int. Cl.
*G10D 1/08* (2006.01)
*G10D 3/06* (2020.01)

(56) References Cited

U.S. PATENT DOCUMENTS

| | | | | |
|---|---|---|---|---|
| 4,653,376 | A * | 3/1987 | Allured | G10H 1/342 |
| | | | | 84/646 |
| 4,702,141 | A * | 10/1987 | Bonanno | G10H 3/185 |
| | | | | 84/645 |
| 4,748,887 | A * | 6/1988 | Marshall | G10H 1/0066 |
| | | | | 84/645 |
| 4,953,439 | A * | 9/1990 | Newell | G10H 1/342 |
| | | | | 84/682 |
| 5,085,119 | A * | 2/1992 | Cole | G10H 1/342 |
| | | | | 84/730 |
| 5,253,526 | A * | 10/1993 | Omura | G01P 15/18 |
| | | | | 73/514.24 |
| 5,300,730 | A * | 4/1994 | Ekhaus | G10H 3/18 |
| | | | | 84/320 |
| 7,381,878 | B2 * | 6/2008 | Cook | G10H 1/00 |
| | | | | 84/464 A |
| 7,897,866 | B2 * | 3/2011 | Sullivan | G10H 1/342 |
| | | | | 84/440 |
| 8,093,482 | B1 * | 1/2012 | Kramer | G10H 1/0551 |
| | | | | 84/645 |
| 8,242,345 | B2 * | 8/2012 | Elion | G10H 1/0066 |
| | | | | 84/646 |
| 8,415,550 | B2 * | 4/2013 | Sullivan | G10H 1/342 |
| | | | | 84/724 |
| 8,796,529 | B2 * | 8/2014 | Butera | G10H 1/342 |
| | | | | 84/743 |
| 8,841,537 | B2 * | 9/2014 | Sullivan | G10H 1/342 |
| | | | | 84/724 |
| 9,053,690 | B2 * | 6/2015 | Thee | G10H 1/38 |
| 9,208,763 | B2 * | 12/2015 | Avitabile | G01L 5/16 |
| 9,646,591 | B1 * | 5/2017 | Young | G10H 3/125 |
| 9,812,107 | B2 * | 11/2017 | Butera | G10H 1/0066 |
| 10,190,920 | B1 * | 1/2019 | Rognlien | G01N 33/0036 |
| 10,339,829 | B2 * | 7/2019 | Grafman | G10H 1/0008 |
| 10,783,865 | B2 * | 9/2020 | Butera | G10H 1/342 |
| 2008/0116280 | A1 * | 5/2008 | Plesko | H01H 3/38 |
| | | | | 200/342 |
| 2009/0260508 | A1 * | 10/2009 | Elion | G10H 1/0066 |
| | | | | 84/646 |
| 2017/0162070 | A1 * | 6/2017 | Grafman | G10H 1/0008 |
| 2022/0326098 | A1 * | 10/2022 | Bastepe-Gray | G01L 5/0038 |

FOREIGN PATENT DOCUMENTS

| | | |
|---|---|---|
| JP | 6390082 B2 | 9/2018 |
| WO | 2017127337 A1 | 7/2017 |

OTHER PUBLICATIONS

SHARP Corporation, GP2S60, SMT, Detecting Distance: 0.5mm Phototransistor Output, Compact Reflective Photointerrupter, SHARP Corporation, Oct. 3, 2005.

* cited by examiner

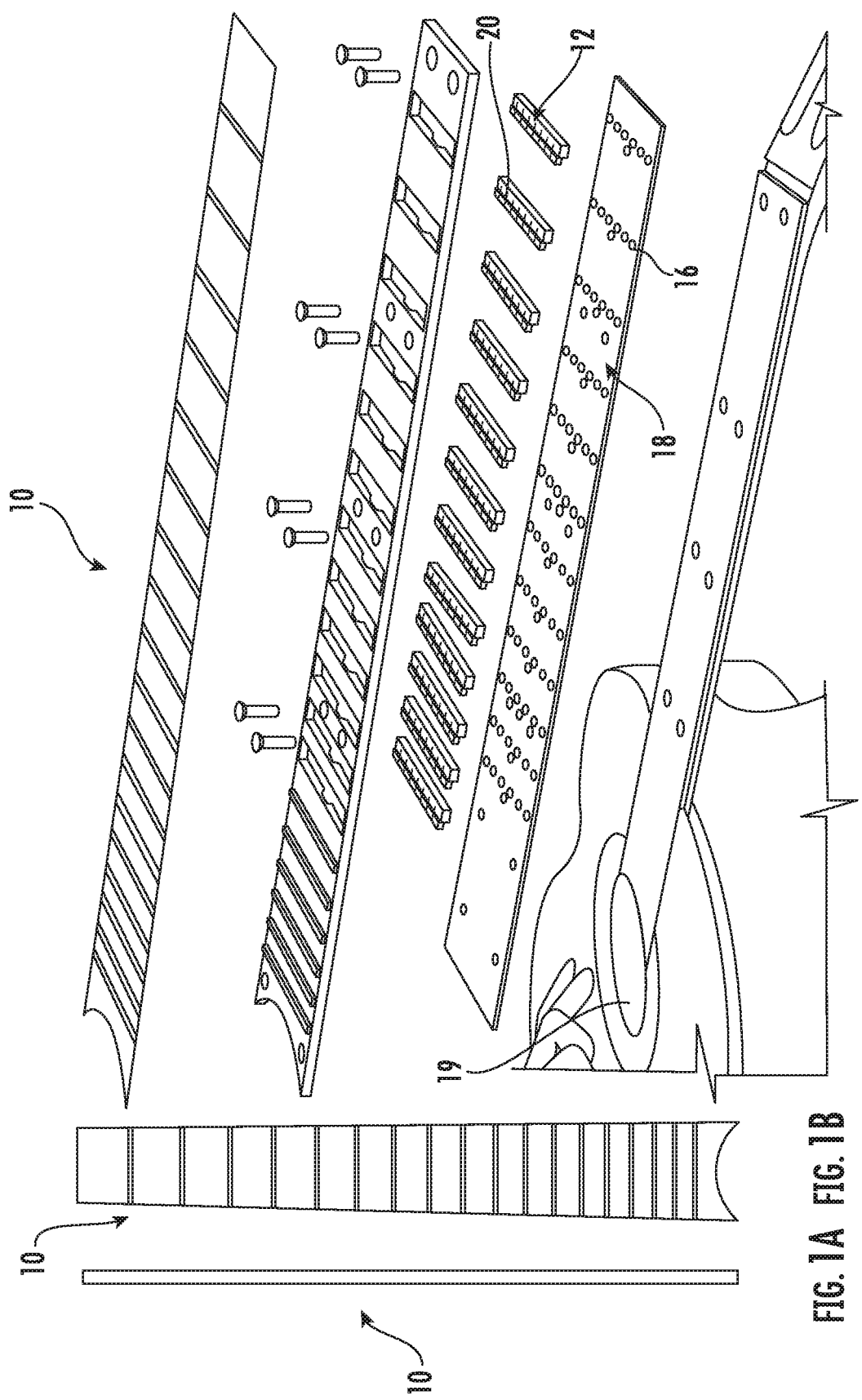

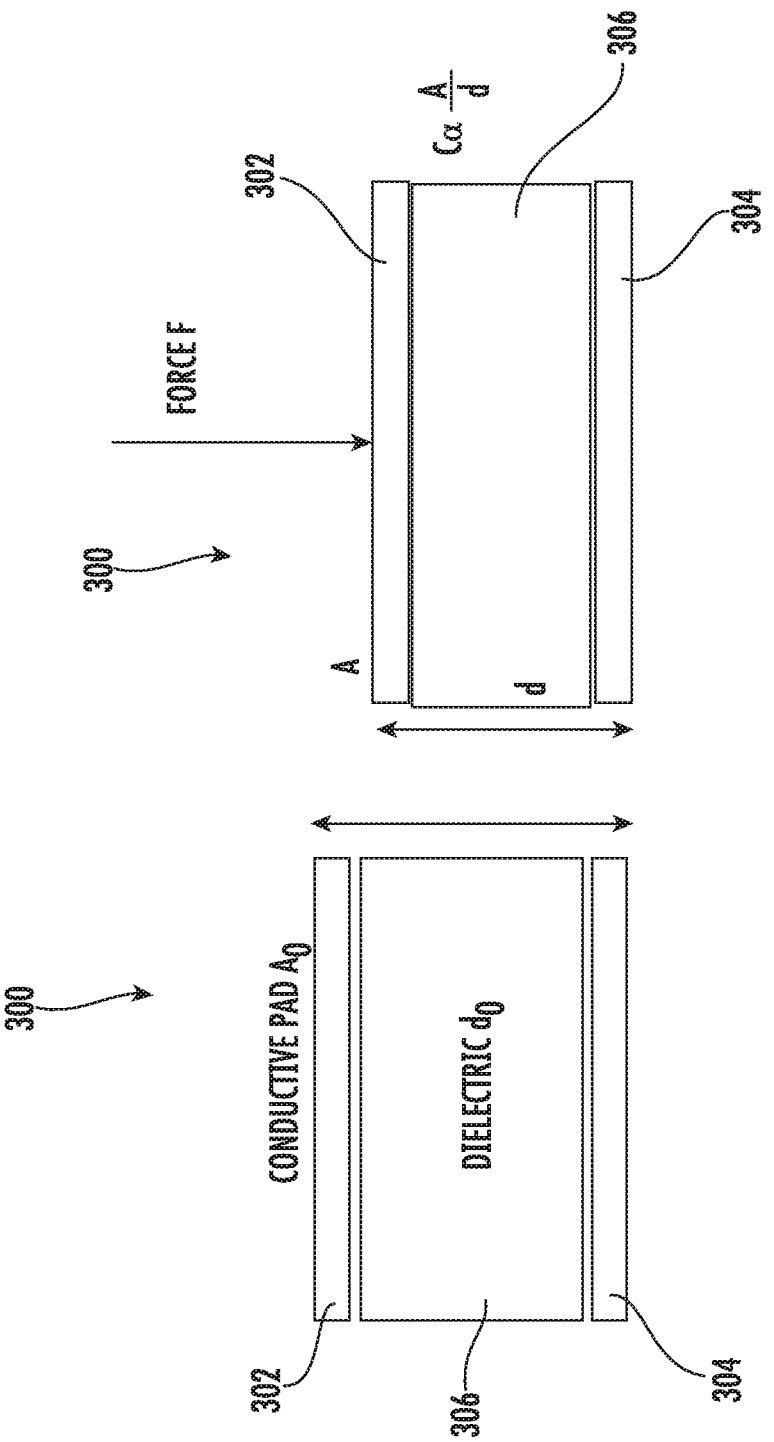

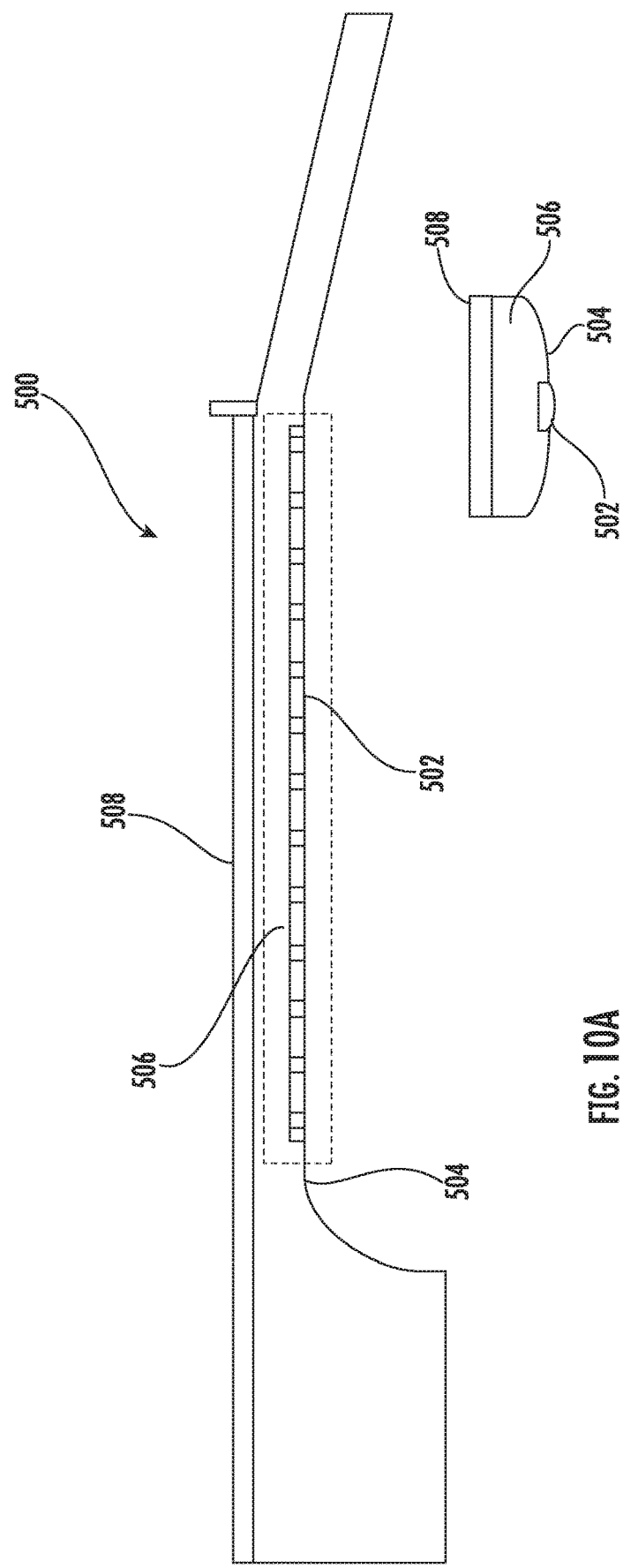

SMART FRETBOARD

CROSS-REFERENCE TO RELATED APPLICATIONS

This application is a 35 U.S.C. § 371 U.S. national entry of International Application PCT/US2020/048740 having an international filing date of Aug. 31, 2020, which claims the benefit of U.S. Provisional Application No. 62/893,900, filed Aug. 30, 2019, the content of each of the aforementioned applications is herein incorporated by reference in their entirety.

FIELD OF THE INVENTION

The present invention relates generally to musical instruments. More particularly, the present invention relates to a device and method for measuring forces applied to a fret board.

BACKGROUND OF THE INVENTION

Musicians experience a disproportionate incidence of playing-related musculoskeletal and neurological disorders (PRMD) with reported prevalence rates of 39-89% in working musicians and 11-64% in student-musicians in training in higher education settings. Further, active music making is not only a job, but also a meaningful occupation to about 62 million amateur instrumentalists in the U.S. According to inferences from a pilot study, more than 6 million Americans play a musical instrument for 20 or more hours per week as a serious leisure activity, and 19.7 million of America's amateur instrumentalists experience significant pain in their arms, hands and necks. Epidemiological studies report PRMD in 17%-38% in high school musicians and 67% in children. Despite heightened awareness in the last 30 years in musicians' occupational health, high PRMD rates prevail, and around 12% of professionally trained musicians permanently discontinue their vocation due to injuries.

Playing musical instruments involve complex neuro-mechanical interactions between biomechanical structures and neural processes. Unlike the neural and cognitive processes, little is known about the biomechanical mechanisms despite the obvious critical importance in musicians' health as well as music pedagogy for injury prevention and rehabilitation. This critical knowledge gap is largely confined by the absence of sophisticated technical experimental devices that can allow recording of biomechanically relevant variables in three-dimensional (3D) space including a lack of tools that can assess operating forces applied to the sound producing mechanisms of musical instruments, notably the stringed instruments.

Research that aims to improve instrumental pedagogy resulted in an emerging knowledge base of expert movement through biomechanical examination of hands and upper extremity. However, the majority of these studies involve piano playing. A small number of studies are conducted on bowed-string instruments, yet the majority of these focus on the large movements of the bowing arm, and the investigations on the left distal upper extremity are largely confined to surface electromyography studies. Only a few small-scale studies investigate the relationship between pain, PRMD and biomechanical attributes of upper extremity and hand during performance. Touch-sensing technology has been employed to the guitar neck with pressure-pads to determine the "notes" that are being played in an effort to facilitate application of midi-technology and gaming, however, these instruments eliminate the strings and are unable to record time-dependent forces applied to the neck with fingers, thus rendering them useless in biomechanical applications.

Measuring force in stringed instruments has technical challenges due to issues with the structural integrity and the tension applied to the neck and body of these instruments by the strings. Despite documented high rates of upper extremity musculoskeletal disorders in stringed instrument players, and the established importance of task related force measurement in the ergonomic assessment and intervention protocols for upper extremity, such an application has not been reported in the literature.

Accordingly, there is a need in the art for a device and method for measuring force on a fret board.

SUMMARY OF THE INVENTION

The foregoing needs are met, to a great extent, by the present invention which provides a device for measuring force used in playing a stringed musical instrument including a sensing fret having a force detecting unit. The force detecting unit includes a touchpoint and a sensor. The device also includes a printed circuit. The sensor is disposed on a surface of the printed circuit and between the surface of the printed circuit and the touchpoint. A force applied to the touchpoint is detected by the sensor.

In accordance with an aspect of the present invention, the sensor can take the form of a photointerrupter. The photointerrupter is configured to detect a distance between the touchpoint and the photointerrupter. The detecting units are formed from aluminum. The number of force detecting units per sensing fret is six. The device can further include twelve sensing frets. The sensor can take the form of one selected from a group of a photoelectric sensor, force-sensitive resistor, force sensing linear potentiometer, a piezoresistive element, piezoelectric element, Velostat®, strain gauge, matrix of mechanical actuators, optical fibers, and sensors using changes in resistance due to applied force. The touchpoint takes the form of a flexure. The device can include a strip of viscoelastic rubber disposed underneath a crown of the flexure. The flexure in some instances has a cantilever shape. The sensor can take the form of a pair of conductive pads on either side of a dielectric. A sensing array can be positioned on a back side of a neck of the stringed musical instrument. Additional sensors can also be included to monitor temperature and relative humidity.

In accordance with another aspect of the present invention, a system for measuring force used in playing a stringed musical instrument includes a sensing fret having a force detecting unit. The force detecting unit includes a touchpoint and a sensor. A force applied to the touchpoint is detected by the sensor and the sensor is configured to transmit information related to the force applied. A non-transitory computer readable medium is configured to receive the information related to the amount force applied and to provide feedback to a user about the force applied.

In accordance with still another aspect of the present invention, the system includes a printed circuit on which the sensor is disposed. The sensor can take the form of one selected from a group consisting of a photoelectric sensor, photointerrupter, force-sensitive resistor, force sensing linear potentiometer, a piezoresistive element, piezoelectric element, Velostat®, strain gauge, matrix of mechanical actuators, optical fibers, and sensors using changes in resistance due to applied force. The photointerrupter is configured to detect a distance between the touchpoint and the photointerrupter. The sensor can also take the form of a pair of conductive pads on either side of a dielectric. A sensing array can be positioned on a back side of a neck of the stringed musical instrument. Additional sensors can be included to monitor temperature and humidity.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 1A-1F illustrate side, top-down, and exploded views of a sensing fretboard, according to an embodiment of the present invention.

FIGS. 8A and 8B illustrate schematic views of capacitive sensing, according to an embodiment of the present invention.

FIGS. 10A and 10B illustrate a guitar neck having sensors disposed on the back, according to an embodiment of the present invention.

DETAILED DESCRIPTION

Figure 1D:
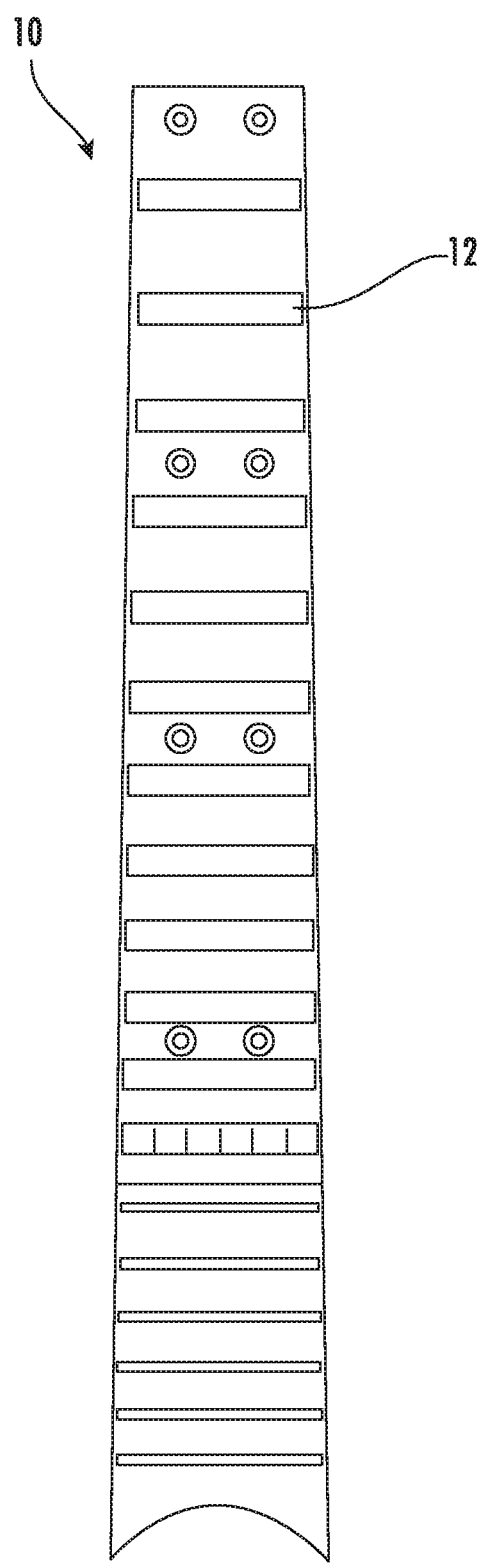

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to a device and method for measuring forces applied to actuating elements of a musical instrument. The present invention does not alter the feel and operation of the actuating elements of the musical instrument. Therefore, authentic performances can be executed with the device of the present invention, while allowing for measurement and collection of time-dependent force data and display of this data in real-time with a graphic interface. The present invention can be used in occupational biomechanics and research on upper extremity biomechanical exposure for musicians. The information produced by a device and method according to the present invention can be used for training musicians in technique. The present invention can also be used for ergonomic assessment of instruments, playing position, playing environments, and other factors impacting playing a musical instrument.

The present invention can be implemented in a number of musical instruments where force is applied to an actuating element, such as a string, a key, or a valve. In particular, the present invention can be implemented in stringed instruments, where a string is pressed to a fretboard or a fingerboard. In a stringed instrument pressure is applied by the musician to the string, fret (if present), and fretboard or fingerboard of the instrument. Such stringed instruments can include, but are not limited to a guitar, violin, viola, cello, bass, bass guitar, or banjo. This pressure applied to these elements can then be measured and recorded using a device according to the present invention. In some implementations of the present invention, time-dependent 3D force data can be recorded and displayed in real-time with a graphic interface on a dedicated screen associated with the present invention, or on the screen of a user's device. The display device can be a personal computer, networked terminal, tablet, phablet, smartphone, or other device known to or conceivable to one of skill in the art. A guitar with pressure sensors is described in detail herein, as an exemplary embodiment of the present invention. The guitar example is not meant to be considered limiting and, it should be noted that the present invention can be implemented on a number of musical instruments.

The present invention is further directed to a sensing fretboard for stringed instruments. The sensing fretboard is described herein with respect to a guitar, but could be applied to any stringed instrument as is known to or conceivable by one of skill in the art. Further, the principles of the present invention can be applied to numerous musical instruments that are actuated by application of pressure, as is known to or conceivable to one of skill in the art. The present invention includes custom frets and a modular sensing array that can be incorporated into a 4 mm thick fretboard and coupled to a guitar. By measuring the dynamic forces applied by the players on the frets and strings of the guitar, musicians can be warned in real time during practice, when their grip is too strong, and to help musicians recover from injuries.

In a preferred embodiment of the present invention, optical proximity sensors are used as the sensing elements. The optical proximity sensors are inexpensive, lightweight, and require minimal space for operation. The nature of the technology also eliminates the possibility of drift or hysteresis. An array of photointerrupters (GP2S60) measures the distance to flexures that deflect proportionally to the force applied. While light isolation is necessary to mitigate interference from adjacent modules, specific design considerations were developed to resolve this issue. Though 3-axis force measurement would be ideal and beneficial for the purposes (to measure forces from vibratos for instance) of the present invention, preliminarily, this invention focuses solely on the vertical force component. Studies on novice and expert players reveal that a sensing range of 0-25 N is sufficient for the average player. After calibrations to the full sensing range and validations, an average error of <0.4 N RMSE (root mean squared error) was achieved and a worst error of <5% FSO (full scale output) at a resolution of about 0.1 N, on 81% of the sensing modules.

Figure 1E:
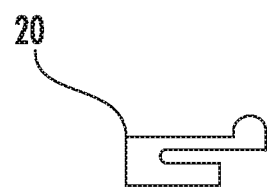
Figure 1F:
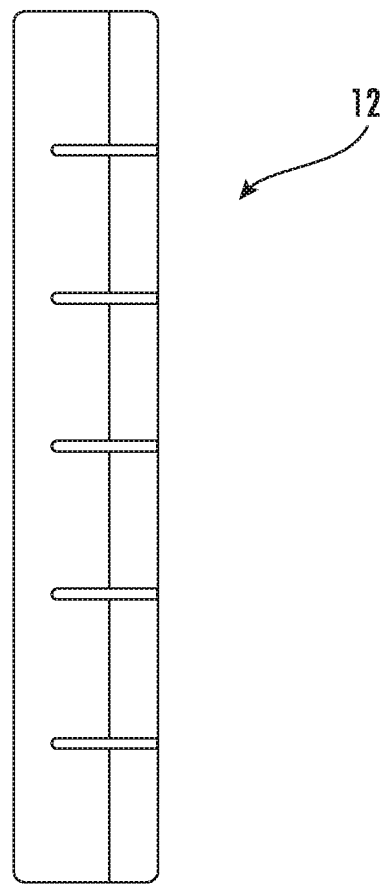

There are many possible implementations for the present invention conceivable to one of skill in the art. Several of these possible embodiments are described herein. However, these exemplary embodiments are not meant to be considered limiting. FIGS. 1A-1F illustrate side, top-down, and exploded views of a sensing fretboard and flexure, according to an embodiment of the present invention. As illustrated in FIG. 1A, the whole device 10 is contained in a custom, 4 mm thick fretboard, which can be mounted on a classical guitar with screws, as illustrated in FIG. 1C. FIGS. 1B and 1D illustrate top-down views of the sensing fretboard device 10. The sensing fretboard device 10 includes sensing frets 12. Each sensing fret 12 includes a flexure unit 14 with each of the six flexures 20 having a photointerrupter 16 underneath. The photointerrupters 16 are disposed on a printed circuit 18. The printed circuit can take the form of a printed circuit board or a printed circuit film. Alternately, any base known to or conceivable to one of skill in the art can be used in place of the printed circuit element. In a preferred embodiment of the present invention, twelve sensing frets 12 are equipped with six flexures 20 and six photointerrupters 16. Therefore, the device 10 includes seventy-two flexure units 14, each containing a flexure 20 and a photointerrupter 16 disposed underneath. A relative humidity sensor 19 is positioned within the body of the guitar. FIGS. 1E and 1F illustrate the flexure 20 and sensing fret 12. Each photointerrupter 16 has an emitter and a detector: infrared light is emitted by the emitter, reflected off from a surface, and received by the detector, which outputs a signal proportional to the amount of light received. When the environment is dark, this corresponds to the distance to the surface. As the force is applied onto the flexure, the distance from the flexure to the photointerrrupter changes. As the calibration curve in FIG. 7 shows, the amount of vertical force is linear to the change in sensor signal. The photointerrupter is used herein as an example, and is not meant to be considered limiting. It can more broadly take the form of any type of photoelectric sensor known to or conceivable to one of skill in the art.

Figure 2A:
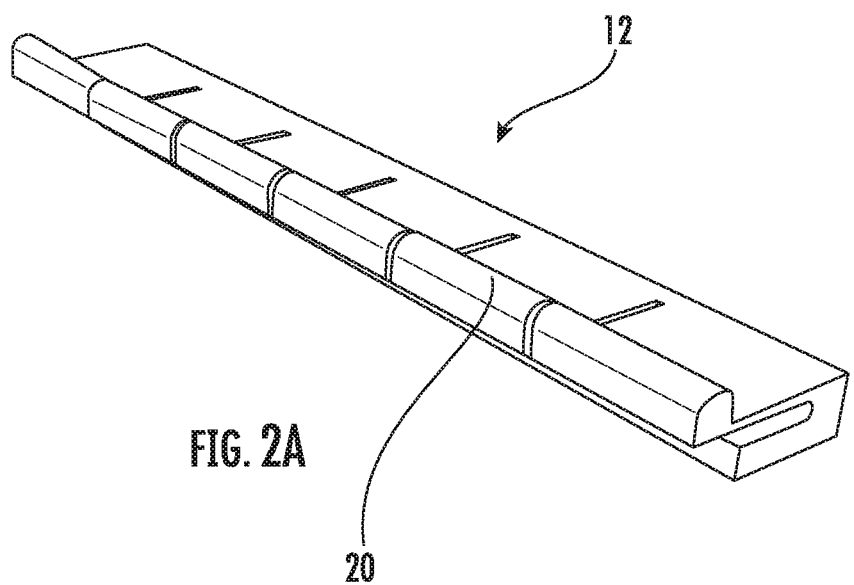
FIG. 2A illustrates a perspective view of a sensing fret with the profile of a regular fret.
Figure 2B:
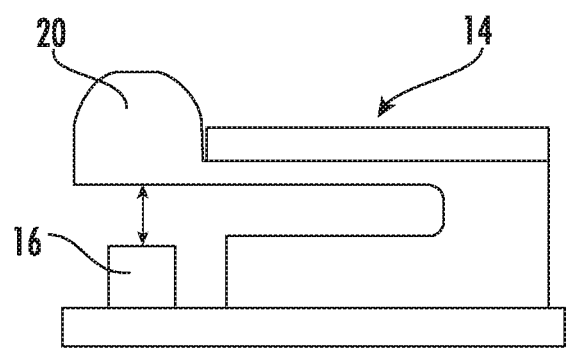
FIGS. 2B and 2C illustrate partially sectional views of the flexure before force is applied and when force is applied, respectively.
Figure 2C:
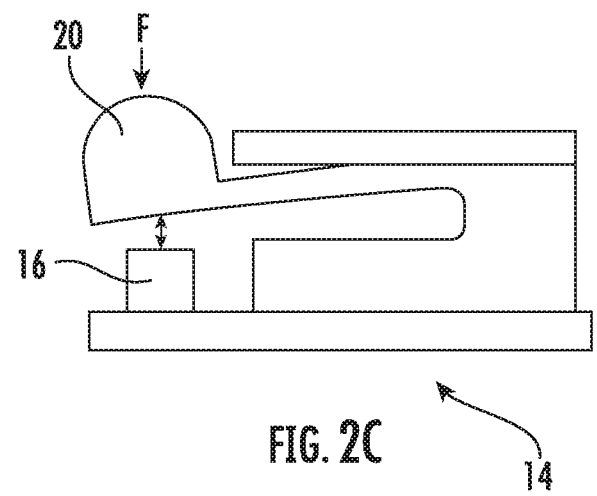

The purpose of the flexures is twofold: to provide a measurable deflection and a fixed boundary condition for which the string can vibrate on to create the standing wave we hear as musical notes. Through a finite element analysis, the thickness of the flexure is designed such that it elastically deflects 0.2 mm under 25N of force. To create the fixed boundary condition, the flexures are designed with the exact same crown profile as a regular fret, with the additional ability to independently deflect under each of the six strings, as shown in FIGS. 2A-2C. A compromise has been made to replace the bottom seven frets (less often used) with non-functional ones in order to house electronic components.

FIG. 2A illustrates a perspective view of a sensing fret with the profile of a regular fret. As described with respect to FIGS. 1A-1E the sensing fret 12 includes six flexure units 14. Each flexure unit 14 includes a flexure 20 and a photointerrupter 16. FIGS. 2B and 2C illustrate partially sectional views of the flexure before force is applied and when force is applied, respectively. When force is applied to the flexure 20, the distance between the flexure 20 and the photointerrupter 16 is decreased, which allows for the force applied to the flexure 20 to be detected.

Figure 3:
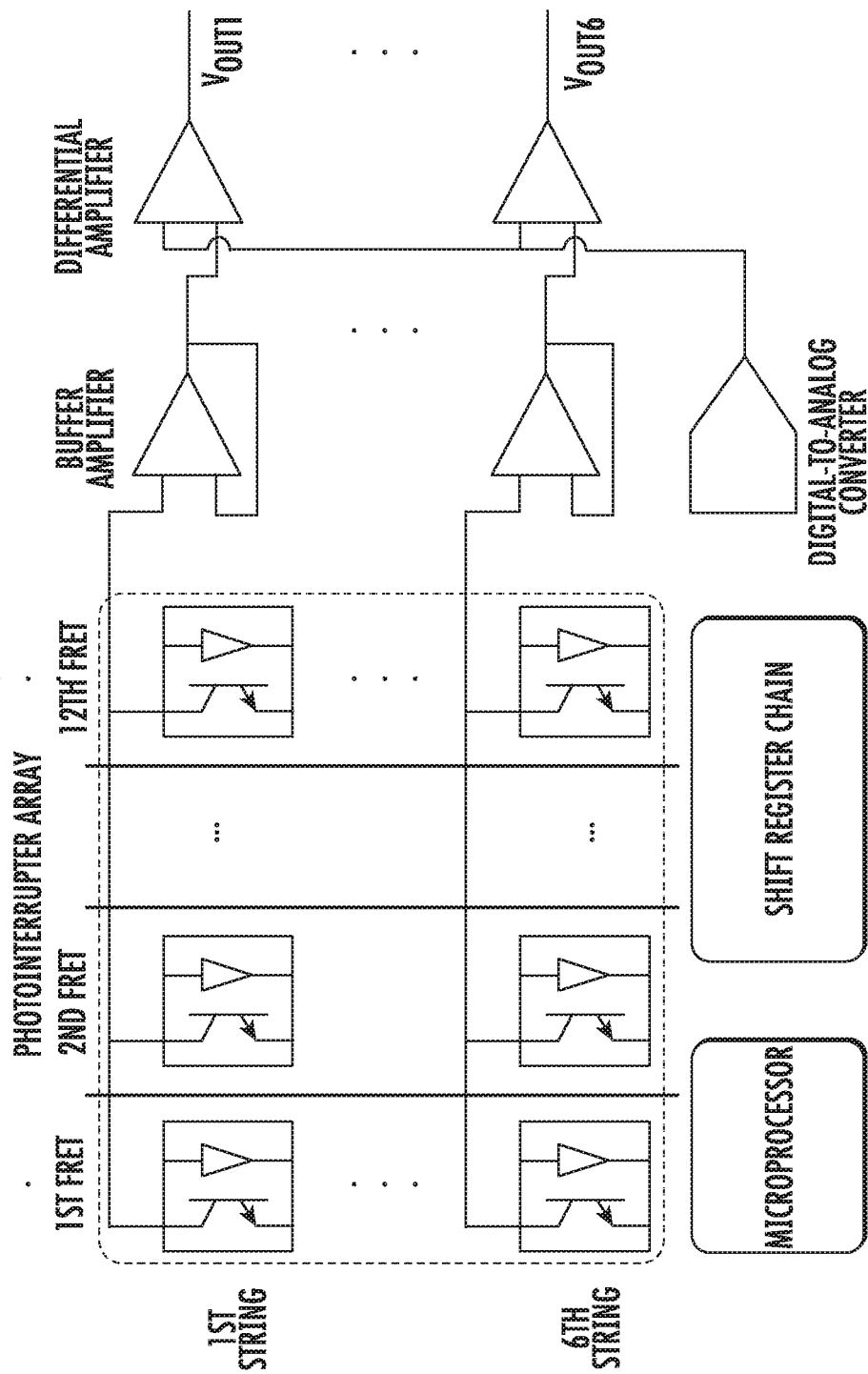
FIG. 3 illustrates a simplified schematic diagram of the circuits. The gray lines in the photointerrupter array indicate light isolation between frets.

FIG. 3 illustrates a simplified schematic diagram of the circuits. The gray lines in the photointerrupter array indicate light isolation between frets. A chain of shift registers (Texas Instruments SN74HC164) activate each of the 72 photointerrupters in sequence. The output signal of each photointerrupter, passing through a unity gain amplifier, is then fed into a differential amplifier (Texas Instruments LM324). There are 6 output lines corresponding to the 6 strings, as illustrated in FIG. 3. A digital-to-analog converter (Texas Instruments TLV5638) provides the reference voltage for each differential amplifier. The whole system is controlled by a microprocessor (Texas Instruments MSP430F5342), which has an internal, 12-bit analog-to-digital converter that reads the sensor signal.

The system is powered through a USB connection through a Micro-USB port installed at the bottom of the guitar. By connecting the fretboard to a computer, the user can visualize real-time force measurements at all locations (FIG. 14) and save them in text files with a custom GUI made in Processing language. The update rate is 20 Hz.

The aluminum flexures are glued onto the printed circuit surface with Araldite glue (Huntsman, The Woodlands, TX) such that each photointerrupter sits directly under each flexure. The printed circuit fits into an aluminum case that houses the flexures and covers the remaining area of the printed circuit. The case is screwed onto the guitar neck with inserts, and a wooden veneer is glued onto the outermost surface. An exploded view of this assembly can be seen in FIG. 1C.

The mechanical and electronic designs ensure that there is no light interference between photointerrupters, which is critical for the optical sensing array. The aluminum case fills the space between the frets thus no light can transmit among them, as shown with the gray lines in FIG. 3. This configuration allows the twelve photointerrupters on the same string to share a single output line. Because each of the six photointerrupters within the same fret are on separate output lines there is also no light interference among the six photointerrupters. In addition, the veneer on top of the case also protects the photointerrupters from any external light source.

Figure 4A:
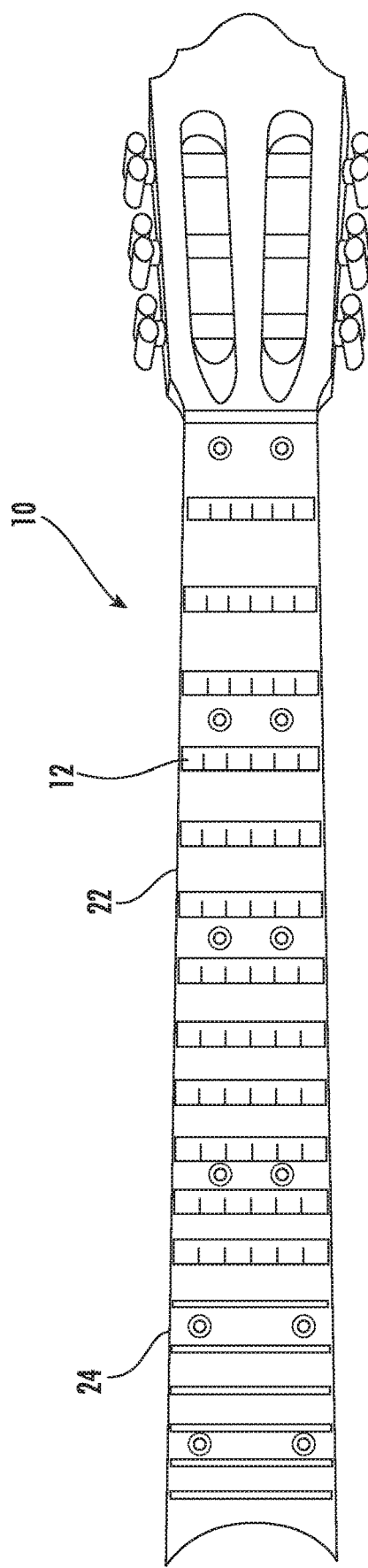
FIG. 4A illustrates a top-down view of an exemplary fretboard.
Figure 4B:
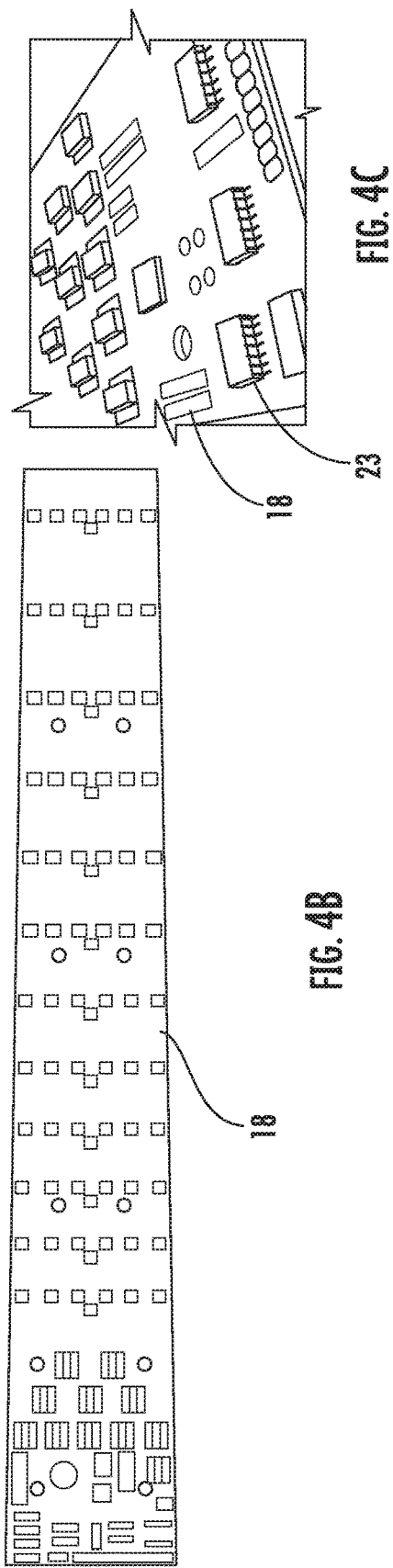
FIG. 4B illustrates a top-down view of the printed circuit underneath, according to an embodiment of the present invention.
Figure 4C:
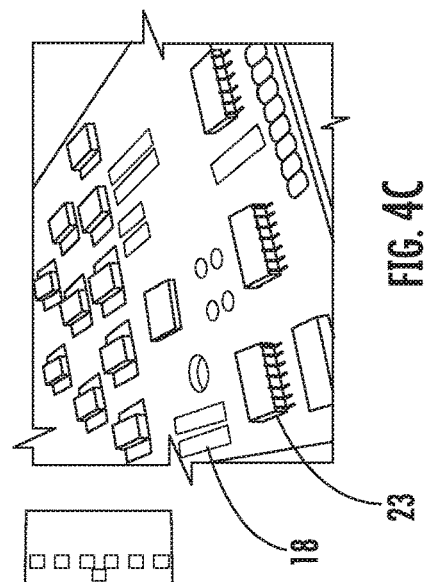
FIG. 4C illustrates a close-up view of the printed circuit, according to an embodiment of the present invention.

FIG. 4A illustrates a top-down view of an exemplary fretboard, FIG. 4B illustrates a top-down view of the printed circuit underneath, and FIG. 4C illustrates a close-up view of the printed circuit, according to an embodiment of the present invention. In the embodiment illustrated in FIG. 4A, the device 10 includes a smart fretboard 22. The smart fretboard includes sensing frets 12 that measure force at each of the top twelve frets of the smart fretboard 22. Under the lower frets, dummy frets 24 house electronic components needed to support the sensors. As illustrated in FIG. 4A, the top twelve frets are sensing frets and the bottom seven frets are dummy frets. It is to be understood that this configuration is an example of how the smart fretboard can be implemented. Any variation in the number of sensing frets or arrangement of dummy frets and sensing frets is considered to be included in the present invention. It is also possible that in some embodiments, all of the frets are sensing frets and the electronic components are stored elsewhere in or on the guitar. In some embodiments, a single piece of printed circuit 18 spans the whole length of the fretboard 22, as illustrated in FIG. 4B. Electronic components 23 are assembled onto the printed circuit, as illustrated in FIG. 4C. The printed circuit can take the form of a printed circuit board or a printed circuit film. Alternately, any base known to or conceivable to one of skill in the art can be used in place of the printed circuit element.

Figure 5B:
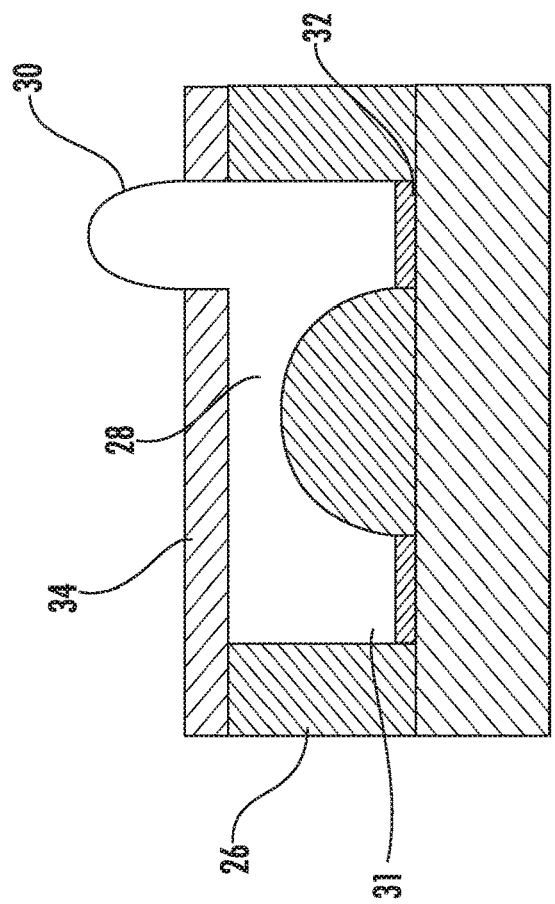
FIG. 5A illustrates a perspective view of a fretboard and FIG. 5B illustrates a partially sectional view of bridge components, according to an embodiment of the present invention.
Figure 5A:
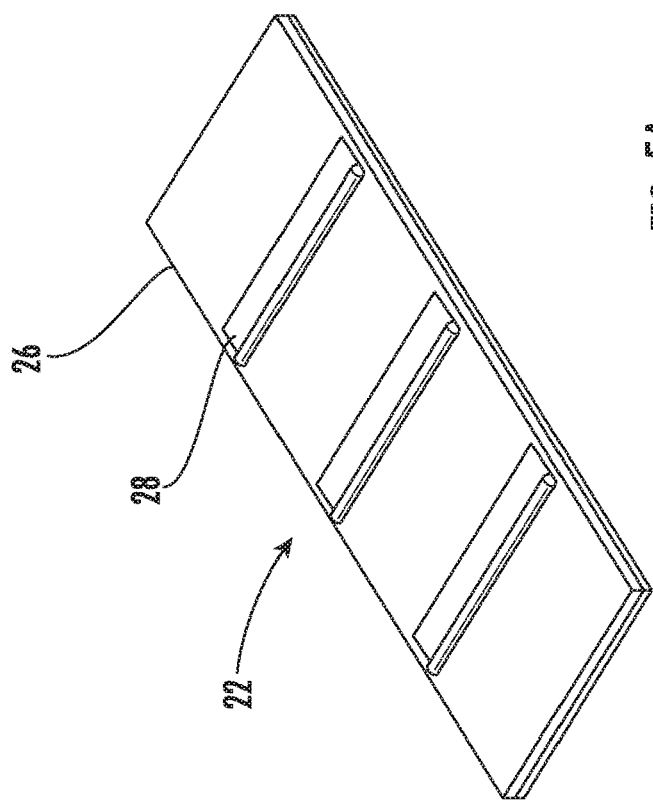

FIG. 5A illustrates a perspective view of a fretboard and FIG. 5B illustrates a partially sectional view of bridge components, according to an embodiment of the present invention. In this embodiment, the applied force can be measured through a number of different sensing elements, such as a Velostat®, strain gauge, matrix of mechanical actuators, piezoresistive crystals, force sensing linear potentiometer, or other sensors using changes in resistance due to applied force. FIG. 5A illustrates a fretboard 22 having a fretboard case 26 and aluminum bridges 28. The aluminum bridge 28 includes a fret 30 and feet 31. Feet 31 are in contact with sensing element 32. A printed circuit 18 is disposed beneath the sensing elements 32 to connect the sensing elements 32 to the electrical components (not pictured). The printed circuit can take the form of a printed circuit board or a printed circuit film. Alternately, any base known to or conceivable to one of skill in the art can be used in place of the printed circuit element. The device can also include a veneer 34 disposed on top of the fretboard case 26.

One such sensing element is a polymer, force-sensitive resistor such as the Velostat®. The feet of the bridge rest on layers of Velostat® which is included as part of a resistive matrix on a printed circuit that spans the length of the neck. When force is applied at the crown or along any part of the bridge, a distribution of forces is transmitted to the feet, creating a change in resistance in the layers of Velostat®, and subsequently a measurable voltage difference. Such a measurement can not only measure the extent of the force but also the location of it along the bridge. The frets are placed at intersections of the Velostat® matrix such that the precise location of force can be determined through a circuit with shift registers, MUXes and related components.

Another such exemplary sensing element is a strain gauge. Strain gauges are widely used in many applications, for force measurement. For the present invention, individual, thin-plate-like strain gauges are placed at each string-fret intersection. These strain gauges measure applied force only in a vertical direction.

A matrix of mechanical actuators can also be used as an exemplary sensor in the bridge embodiment. The printed circuit sits under the matrix of mechanical actuators. The printed circuit can take the form of a printed circuit board or a printed circuit film. Alternately, any base known to or conceivable to one of skill in the art can be used in place of the printed circuit element. A silicone rubber stem is provided as the elastic element, pressing against a polyvinyldene fluoride or polyvinyldene difluoride (PVDF) film beneath it to generate a signal change proportional to the applied force. Thus, the travel is reduced and a continuous signal can be measured (as opposed to a contact response).

Another such exemplary sensor is a piezoelectric element such as piezoresistive crystals. Piezoresistive crystals can be placed at each string-fret intersection either as the elastic element itself or underneath one similar to the flexure described in the primary embodiment. The charge generated by the piezoresistive crystal under mechanical strain being applied to the fret is measured through a 2-dimensional array circuit as described in the primary embodiment, where optical sensor output is replaced with the generated voltage. The piezoresistive crystals can be embedded into slots on the fretboard with adhesives. Instead of piezoresistive crystals, other piezoelectric elements such as piezofilm elements such as poly-L-lactide acid films from muRata® or other piezoelectric elements know to or conceivable to one of skill in the art can be implemented similarly.

A force sensing linear potentiometer (FSLP) can also be used. A FSLP uses changes in resistance due to applied force. It should be noted that while a number of exemplary sensing elements are described herein, these exemplary sensing elements are not meant to be considered limiting. Any sensing element known to or conceivable to one of skill in the art is also considered to be within the scope of this invention.

Figure 6A:
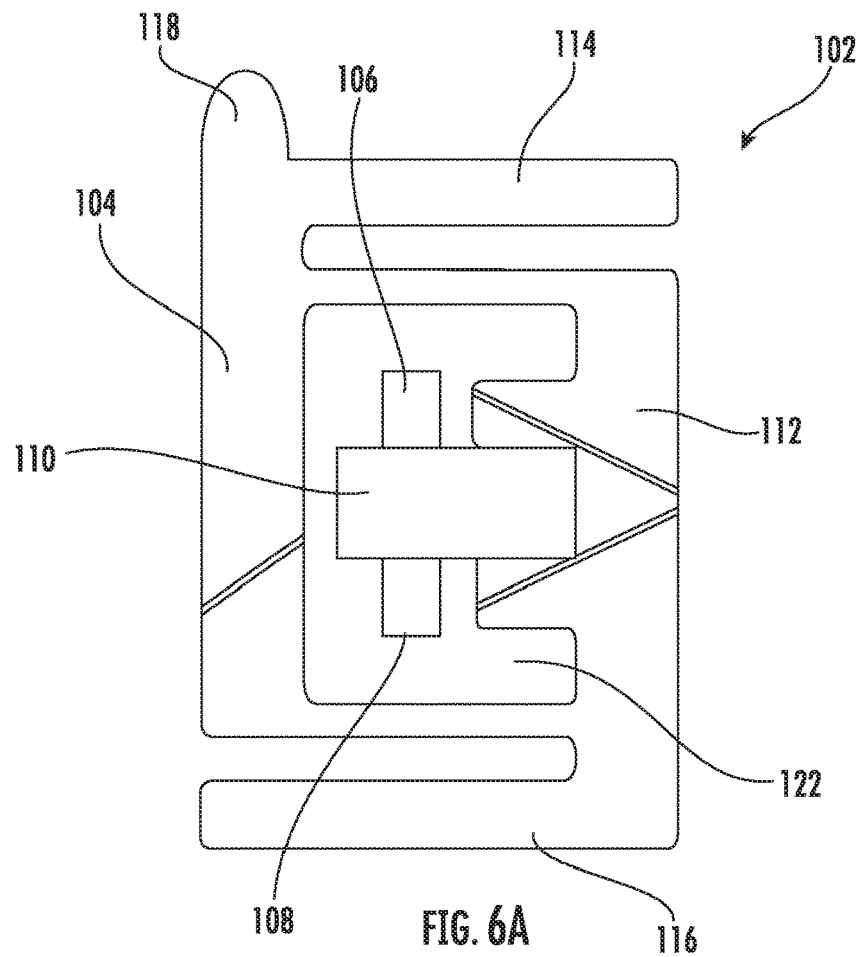
FIGS. 6A and 6B illustrate partially sectional views of one embodiment of the sensing fretboard, according to the present invention.
Figure 6B:
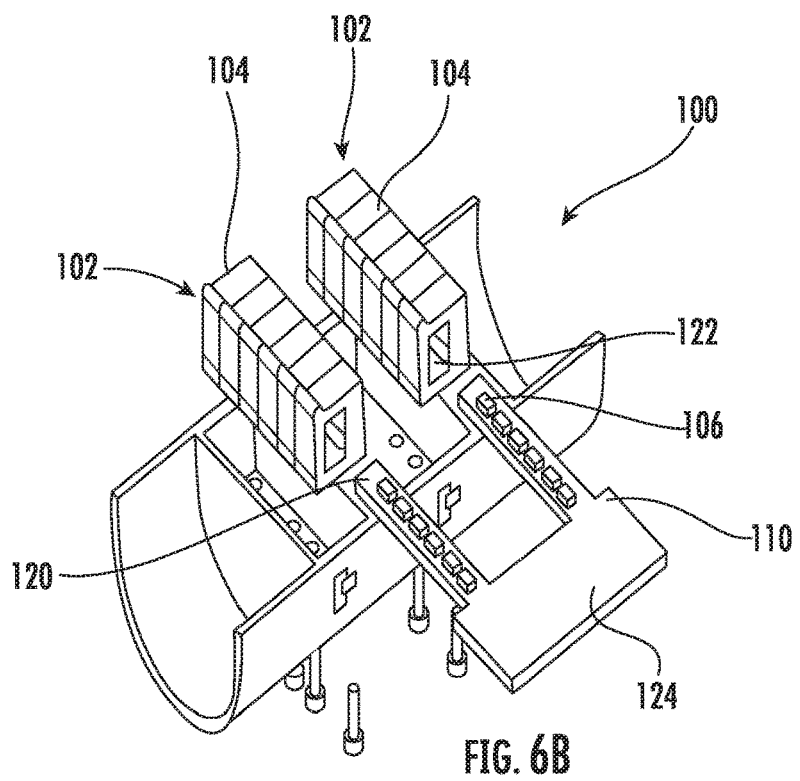

FIGS. 6A and 6B illustrate partially sectional views of one embodiment of the sensing fretboard, according to the present invention. In the embodiment illustrated in FIGS. 6A and 6B, the device 100 includes modules 102 that contain an S-shaped flexure 104, a pair of reflective sensors 106, 108 mounted on a printed circuit 110, and an enclosing case 112 for structural support. The design of the S-Shaped flexure 104 generates a signal differential between the outputs of the two optical sensors in the pair of reflective sensors 106 at a single fret-string intersection. The S-Shaped flexure 104 includes cantilevered portions 114 and 116. This signal differential increases force sensitivity and rejects unwanted effects from local temperature differences. The S-shaped flexure 104 is designed to have the shape of a regular fret 118 and is manufactured to allow independent deflection under each of the strings of the guitar while being electronically connected as a single unit. The system according to FIGS. 6A and 6B replaces a section of the guitar neck. As illustrated, the printed circuit 110 includes fingers 120 that extend into a cavity 122 defined by the S-shaped flexure 104. The fingers 120 are connected by a connecting section 124 to provide electrical connection to the electrical components (not illustrated). While this configuration is provided as an example, the printed circuit 110 and electronics can be arranged and connected in any way known to or conceivable to one of skill in the art. The printed circuit 110 can take the form of a printed circuit board or a printed circuit film. Alternately, any base known to or conceivable to one of skill in the art can be used in place of the printed circuit element.

Figure 7B:
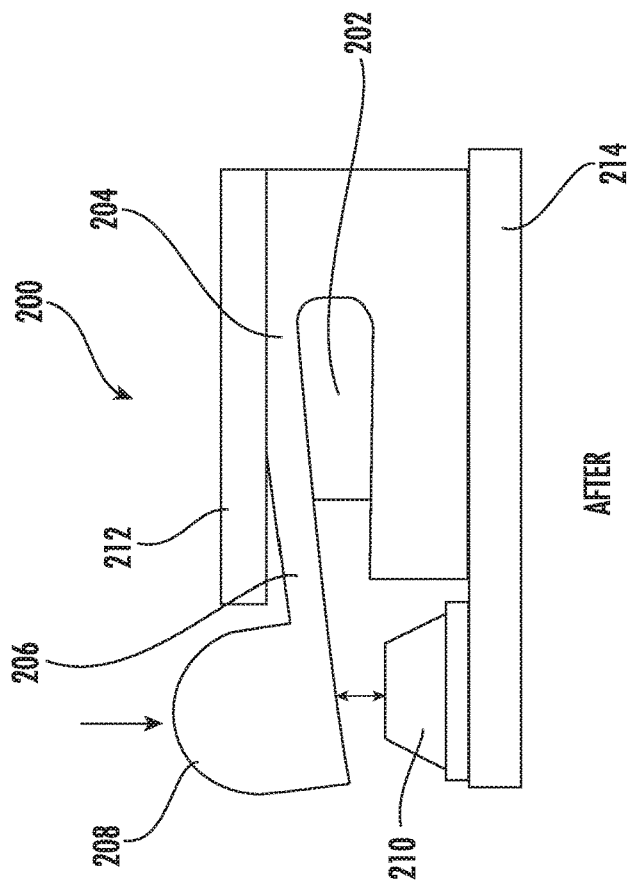
FIGS. 7A and 7B illustrate partially sectional views of a device with viscoelastic material positioned beneath frets, according to an embodiment of the present invention.
Figure 7A:
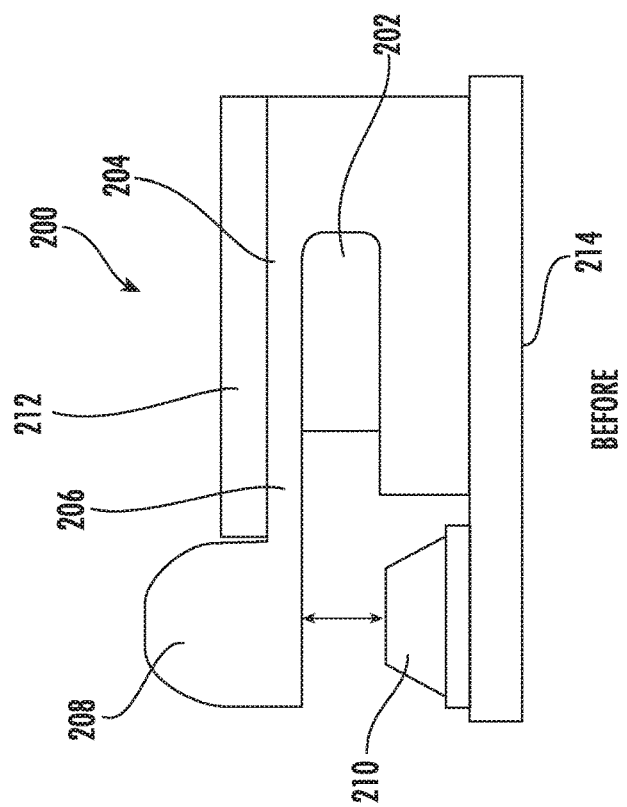

FIGS. 7A and 7B illustrate partially sectional views of a device with viscoelastic material positioned beneath frets, according to an embodiment of the present invention. In the embodiment of FIGS. 7A and 7B, the device 200 includes strips of viscoelastic rubber 202 are inserted underneath a crown 204 of the cantilever-shaped flexure 206. This configuration allows the fret 208 to be deflected downward causing the compression of the viscoelastic rubber 202. When the fret 208 is deflected downward, the distance between the fret 208 and the sensor 210, in this instance a reflective sensor, is decreased, as is illustrated between FIG. 7A in the relaxed position and FIG. 7B in the depressed position. Slight deflection from the fretboard veneer 212 and the fret 208 can also be seen as illustrated in FIG. 7B, and construction of the device 200 should be executed to allow for this deflection. The sensor 210 is mounted to a printed circuit 214. The printed circuit 214 connects the sensors to the electronic components (non-pictured). The printed circuit 214 can take the form of a printed circuit board or a printed circuit film. Alternately, any base known to or conceivable to one of skill in the art can be used in place of the printed circuit element. The sensors 210 can also be connected to the electronic components or configured to transmit information in any other way known to or conceivable to one of skill in the art. The non-linear shear stress to shear rate response of the viscoelastic rubber 202 allows low frequency deformation, and also rejects unwanted high frequency deformation such as those caused by string vibrations. The increased level of rigidity generated by the viscoelastic rubber 202 beneath the crown 204 of the cantilever-shaped flexure 206, also provides a feeling closer to that of a regular fret which is pressed and glued onto the fretboard.

FIGS. 8A and 8B illustrate schematic views of capacitive sensing, according to an embodiment of the present invention. In the embodiment of the device 300 shown in FIGS. 8A and 8B, two conductive pads having electrodes 302, 304 sit under the string-fret intersection. The electrodes at the two conductive pads 302, 304 are separated by a compressible dielectric 306 that fills the space defined between the two conductive pads 302, 304. As the player applies forces on the fret, the top conductive pad 302 is depressed downward compressing the dielectric 306, and the gap between the pads decreases, in turn reducing capacitance. The electrodes of the two conductive pads 302, 304 are electrically connected to a printed circuit (not pictured). The printed circuit measures changes in capacitance and convert those changes in capacitance to changes in forces. Compared to resistive sensors, capacitive sensors are more robust to repeated uses and require less calibrations.

Figure 9A:
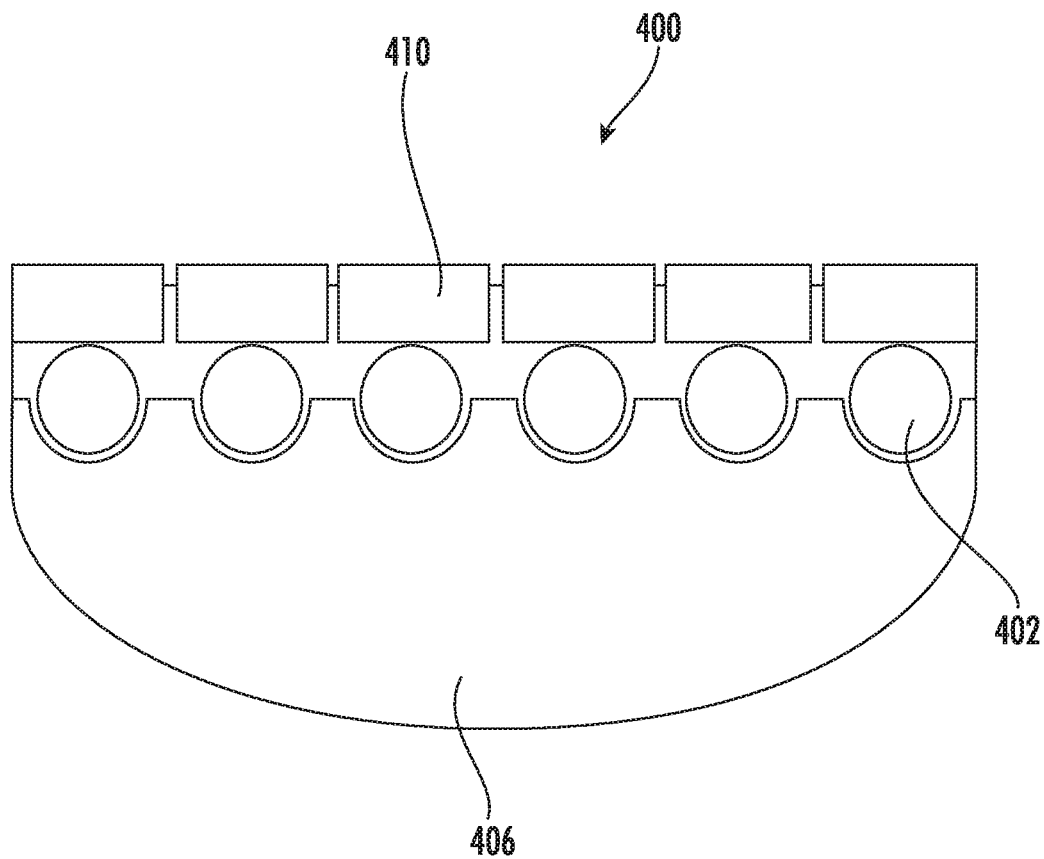
FIG. 9A illustrates a cross-sectional view of fiber optic sensors used under the frets.
Figure 9B:
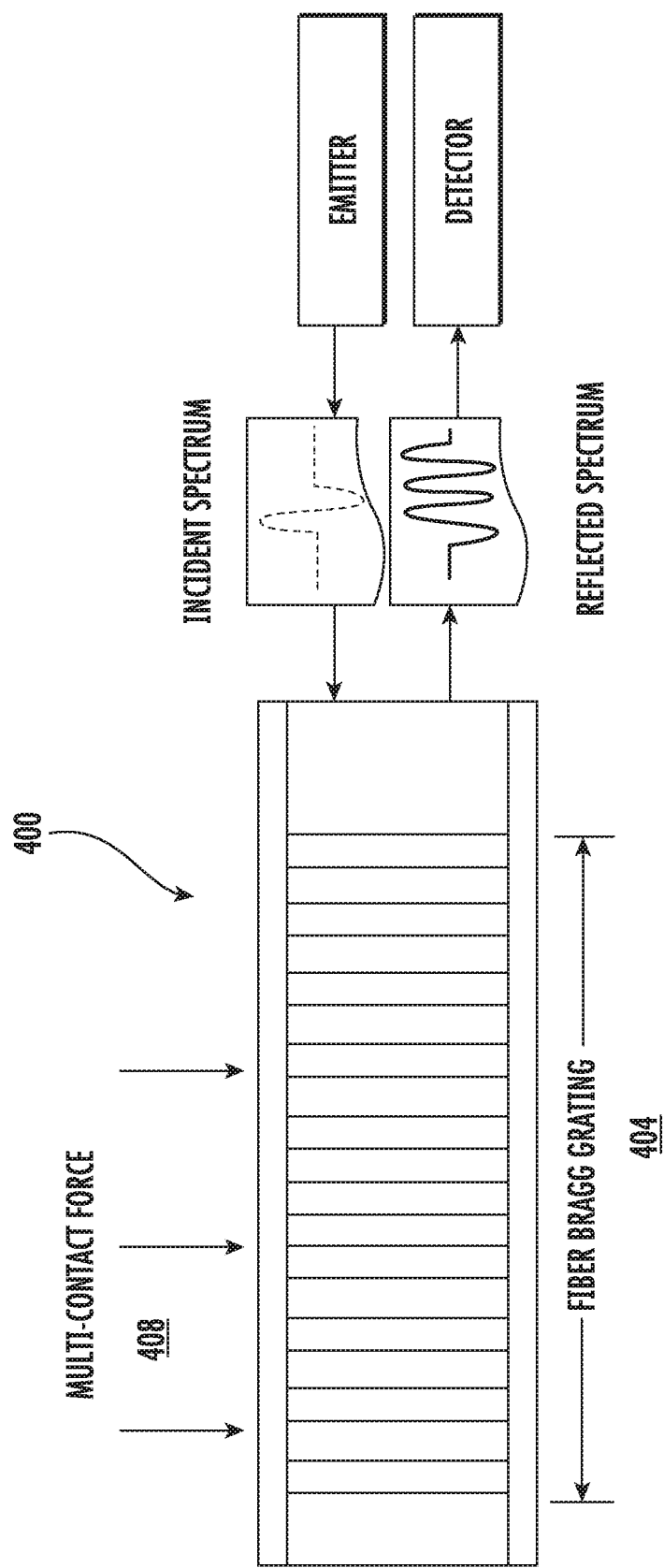
FIG. 9B illustrates a schematic diagram of the fiber optic system, according to another embodiment of the present invention.

FIG. 9A illustrates a cross-sectional view of fiber optic sensors used under the frets, and FIG. 9B illustrates a schematic diagram of the fiber optic system, according to another embodiment of the present invention. In the device 400 of FIGS. 9A and 9B, fiber optic sensors 402 consisting of fiber bragg gratings (FBG) 404 are attached on the surface of the mechanical structure, in this case, guitar neck 406, and oriented perpendicular to the application of force 408 from frets 410 to measure strain deformations. When an external strain is produced, the reflected Bragg wavelength produces a proportional shift that can be measured and correlated to the force applied 408 given known physical parameters of the fiber optic sensor 402. FBG sensors 404 have the advantages of having a small footprint (80-125 micrometers in length), lightweight, and are immune to electromagnetic noise.

FIGS. 10A and 10B illustrate a guitar neck having sensors disposed on the back, according to an embodiment of the present invention. As illustrated in FIGS. 10A and 10B, a guitar 500 according to the present invention can also include sensors 502 positioned along the back 504 of the neck 506 of the guitar 500. In addition to sensing forces by the fingers on the fretboard 508, the sensors 502 positioned along the back 504 of the neck 506 of the guitar 500 can be extended using any sensor implementation to capture and record the force applied by the player's thumb on the neck. These sensors 502 can be electrically coupled to the same electrical components as the fret sensor system or can include their own electronics. The sensors 502 along the back 504 of the neck can be a stand-alone feature or can be paired with any of the fretboard sensor devices described above.

Figure 11:
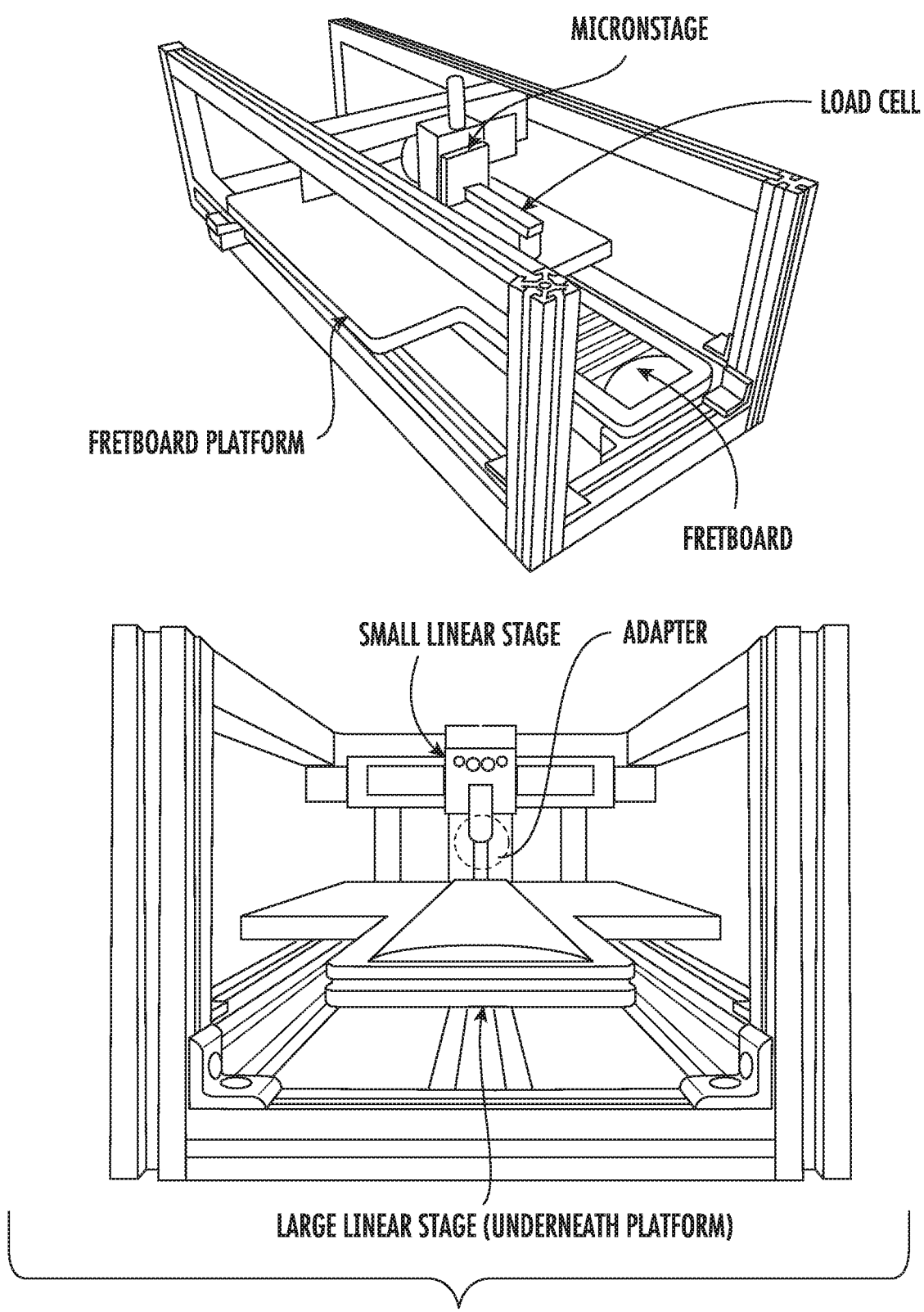
FIG. 11 illustrates perspective views of a testing rig to apply force efficiently across all 72 sensor modules.

A testing setup that can move freely along both the string and fret direction to calibrate and validate each of the 72 sensing modules efficiently is used to test force application. The application of force onto the crown of the sensing unit, as illustrated in FIG. 11, is performed with the controlled displacement of a micronstage. A loadcell is mounted at the tip of the micronstage to provide the ground truth reading against the output of the sensing module. FIG. 11 illustrates perspective views of a testing rig to apply force efficiently across all 72 sensor modules.

Figure 12:
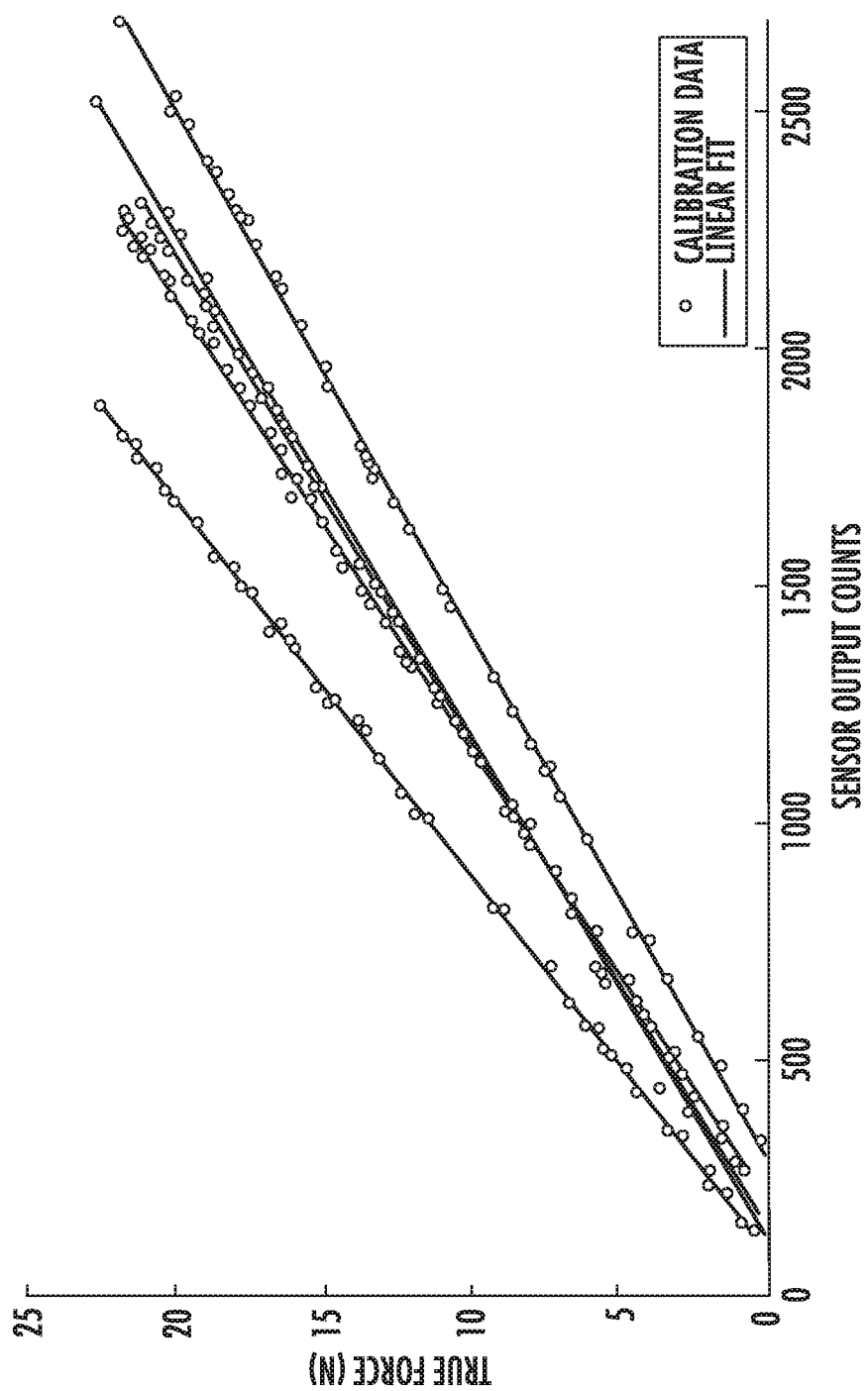
FIG. 12 illustrates a graphical view of a calibration results of five randomly chosen sensing modules.
Figure 13A:
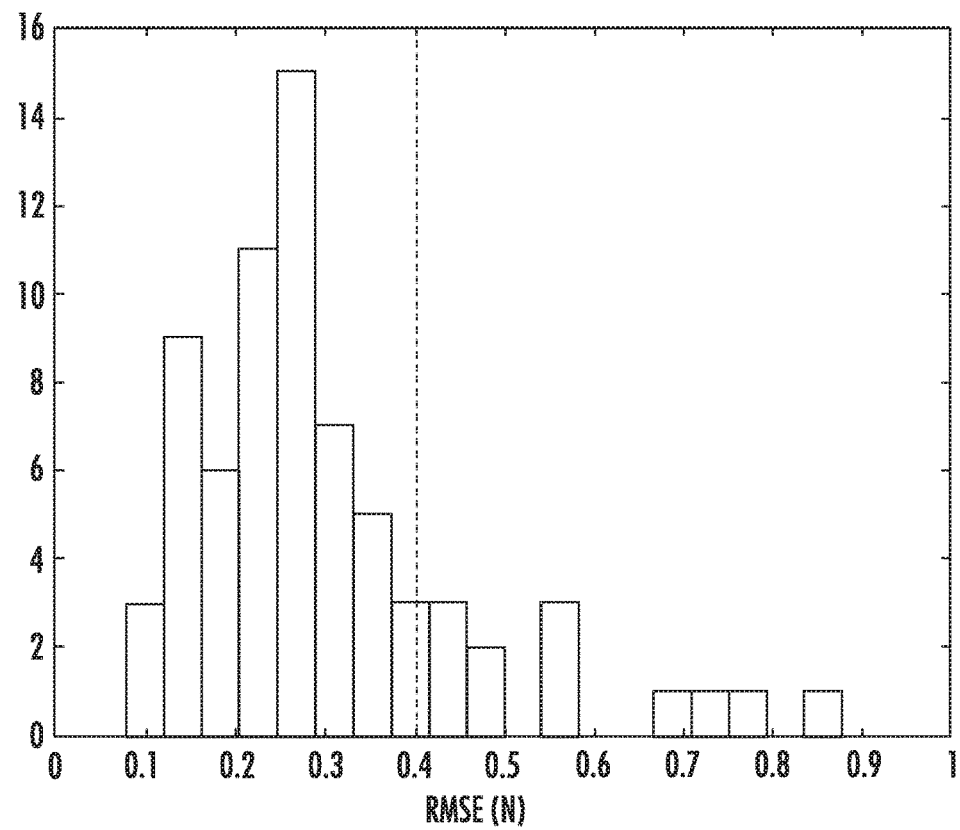
FIGS. 13A and 13B illustrate graphical views of error for all modules.
Figure 13B:
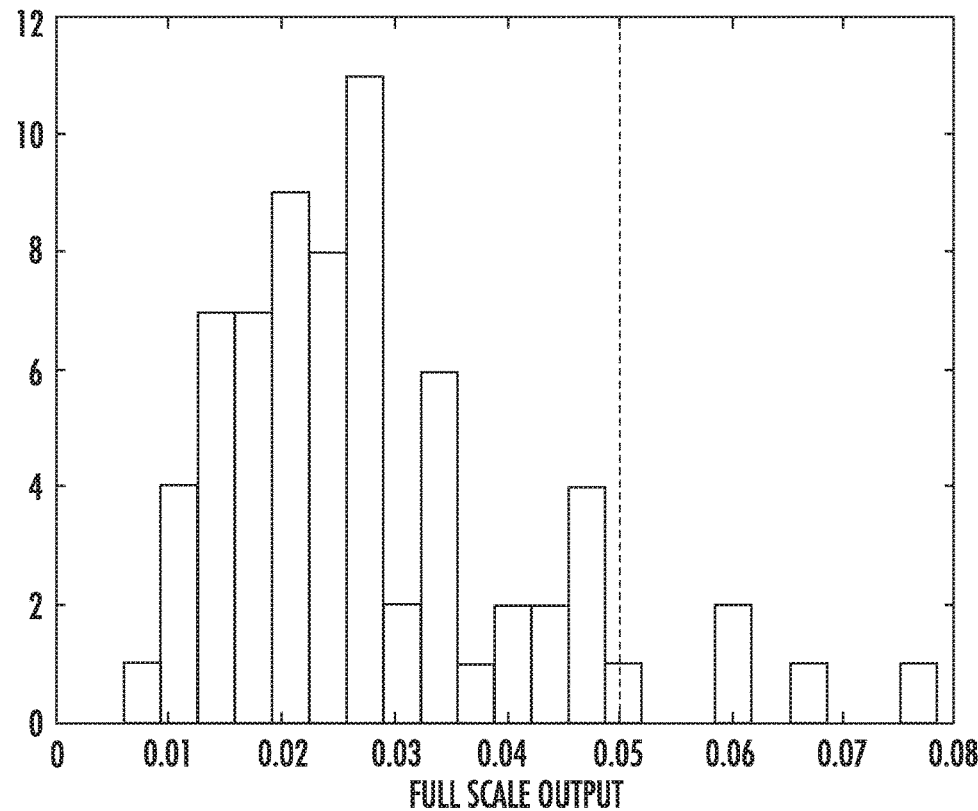

FIG. 12 illustrates a graphical view of a calibration results of five randomly chosen sensing modules. The coefficient of determination for each is higher than 0.99. FIGS. 13A and 13B illustrate graphical views of error for all modules. FIG. 13A illustrates a histogram of the average error (RMSE) for all modules; FIG. 13B illustrates a histogram of the worst error (FSO) for all modules. Red dotted lines show the desired 0.4 N average error and 5% FSO worst error. Each of the 72 sensing modules was unloaded between 0 and 25N for 2 trials. Results for all modules exhibit a high linearity between sensor output and true force measured by the load cell, as illustrated in FIG. 11. To test the accuracy of the sensing modules, random amount of forces were applied to the sensors using the micron stage and calculated the errors based on individual calibration curves. FIGS. 13A and 13B shows the histograms for the average error (RMSE) and the worst error (FSO) for all 72 sensing modules. 81% of the modules show an average error of <0.4 N RMSE, and 90% of the modules show a worst error of <5% FSO. The results satisfy the high accuracy desired for the purposes of the present invention.

An exemplary implementation of the present invention is directed to a novel multi-contact force-sensing fretboard for a classical guitar. Previous deficiencies regarding multi-contact and shape modification were addressed with the design of a compact force-sensing array that can substitute as a 4 mm thick fretboard. The technical capabilities were evaluated with a test rig to demonstrate the desired accuracy and linearity. The functionality and feel of the system have also been evaluated by novice and expert musicians from the Peabody Institute of the Johns Hopkins University (FIGS. 13A and 13B), the result of which showed general satisfaction.

Figure 14:
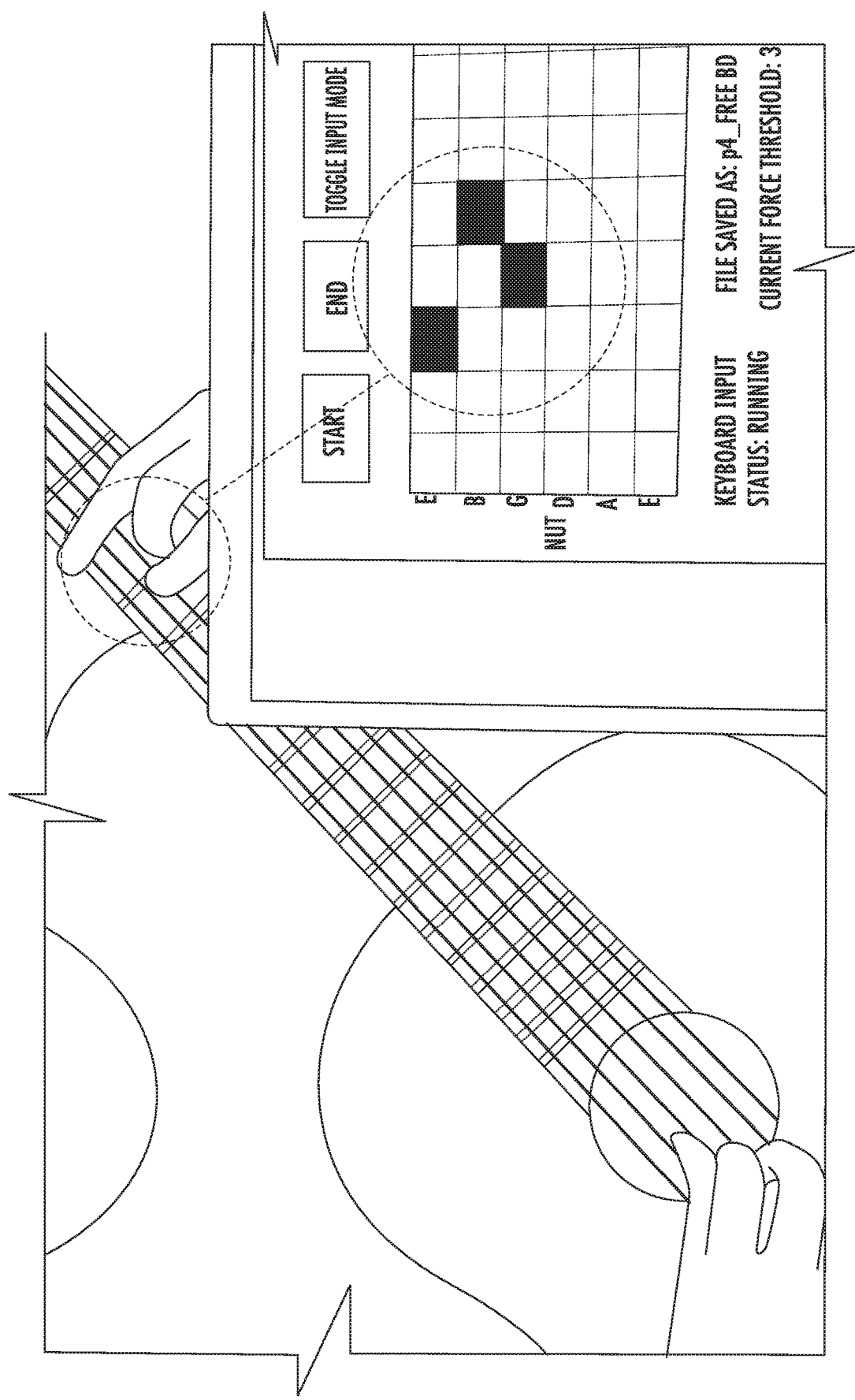
FIG. 14 illustrates an image view of a GUI accompanying the system during user testing.

FIG. 14 illustrates an image view of a GUI accompanying the system during user testing. The grey tiles in the circle show where the fingers are and the extent of forces. If the user presses too hard (above some pre-defined threshold), the tiles will change color. Other forms of alert could also be used including sound, lights, or haptic feedback to the user. Software associated with the device can monitor, evaluate, and report the guitar student's practice sessions to an instructor. The ability to measure force and the specific fret-string intersections means note and chord accuracy can be evaluated compared to the song being played as part of the practice session. Reports quantifying such accuracy and applied forces can be automatically generated and sent to the instructor. Such software has inherent value both as teaching/learning and occupational therapy tool.

Variances between sensing modules may be caused by local temperature differences. A temperature compensation system is installed within the current prototype. However, it was not used during the user tests despite being tested independently from the current system. Beyond six photointerrupters at each fret, an extra one was placed in the middle and measures against a fixed surface. Assuming that temperature affects all sensors in the same manner, the differential between each of the six photointerrupters while the fixed one should remain constant irrespective of the temperature. Other future directions include improving the response rate of the system and reducing electronic noise.

Humidity monitoring may also be useful to prevent damage to the guitar and to ensure proper sensor functioning. A relative humidity sensor can be placed on or within the body of the guitar to monitor humidity. This humidity sensor can be coupled to the same printed circuit as the force sensing system of the smart fretboard. The humidity sensor can take the form of a surface mount-technology (SMT), relative humidity sensor. The SMT relative humidity sensor can continuously monitor the humidity values within the guitar for relative humidity values outside of the safe zone. When the relative humidity sensor detects a condition beyond the safe range and the instrument is in danger of damage, the controller will send a wireless signal (alert, alarm, message) to the user's phone alerting them of the condition so that the user can take action to correct by remembering to add water to the humidifier, or putting the guitar back into a safer humidity controlled environment. The relative humidity sensor transmits information via wired connection or wirelessly. A wireless transmission solution includes WiFi, Bluetooth®, and Bluetooth® Low Energy (BLE).

The electronic components of the present invention can be powered in a number of ways include via USB cable, battery, or power cord. A battery based power solution can be replaceable or rechargeable.

In all of these embodiments, the data detected by the sensors in the device can be used to provide feedback to the user in a variety of ways. One way is to provide the user with a retrospective analysis of sensor data coordinated with their musical score and audio recordings of their performance. Another way is to provide real time feedback about the sensor data while the user is playing, which could be done using visual feedback such a screen or lights such as LEDs mounted on the instrument, audio feedback such as a by modulating the guitar sound or adding an additional sound with properties (volume, frequency, etc.) calculated from the sensor readings, or haptic feedback using actuators such as vibration motors, which can be fixed to the user's body or to the instrument.

All of the exemplary embodiments described herein include software with graphical user interface (GUI) to collect and display time-dependent force data on digital screen via plug-in codes included in the software. Parts of the present invention can be carried out using a computer, non-transitory computer readable medium, or alternately a computing device or non-transitory computer readable medium incorporated into the musical instrument device, associated with the present invention. Indeed, any suitable method of calculation known to or conceivable by one of skill in the art could be used. The musical instrument can be connected to the computing device using wired or wireless connections known to or conceivable to one of skill in the art, including WiFi, Bluetooth®, and Bluetooth® Low Energy (BLE).

A non-transitory computer readable medium is understood to mean any article of manufacture that can be read by a computer. Such non-transitory computer readable media includes, but is not limited to, magnetic media, such as a floppy disk, flexible disk, hard disk, reel-to-reel tape, cartridge tape, cassette tape or cards, optical media such as CD-ROM, writable compact disc, magneto-optical media in disc, tape or card form, and paper media, such as punched cards and paper tape. The computing device can be a special computer designed specifically for this purpose. The computing device can be unique to the present invention and designed specifically to carry out the method of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While exemplary embodiments are provided herein, these examples are not meant to be considered limiting. The examples are provided merely as a way to illustrate the present invention. Any suitable implementation of the present invention known to or conceivable by one of skill in the art could also be used.

What is claimed is:

1. A device for measuring force used in playing a stringed musical instrument comprising:
a sensing fret having a force detecting unit, wherein the force detecting unit comprises a touchpoint and a sensor, wherein the touchpoint comprises a flexure and a strip of viscoelastic rubber disposed underneath a crown of the flexure;
a printed circuit wherein the sensor is disposed on a surface of the printed circuit and wherein the sensor is disposed between the surface of the printed circuit and the touchpoint; and
wherein a force applied to the touchpoint is detected by the sensor.

2. The device of claim 1 wherein the sensor comprises a photointerrupter.

3. The device of claim 1 wherein the force detecting units are formed from aluminum.

4. The device of claim 1 wherein the number of force detecting units per sensing fret is six.

5. The device of claim 1 further comprising twelve sensing frets.

6. The device of claim 2 wherein the photointerrupter is configured to detect a distance between the touchpoint and the photointerrupter.

7. The device of claim 1 wherein the sensor comprises one selected from a group consisting of a photoelectric sensor, force-sensitive resistor, force sensing linear potentiometer, a piezoresistive element, piezoelectric element, Velostat®, strain gauge, matrix of mechanical actuators, optical fibers, and sensors using changes in resistance due to applied force.

8. The device of claim 1 wherein the flexure has a cantilever shape.

9. The device of claim 1 wherein the sensor comprises a pair of conductive pads on either side of a dielectric.

10. The device of claim 1 further comprising a sensing array positioned on a back side of a neck of the stringed musical instrument.

11. The device of claim 1 further comprising additional sensors to monitor temperature and humidity.

12. A system for measuring force used in playing a stringed musical instrument comprising:
a sensing fret having a force detecting unit, wherein the force detecting unit comprises a touchpoint and a sensor;
wherein a force applied to the touchpoint is detected by the sensor and wherein the sensor is configured to transmit information related to the force applied; and a non-transitory computer readable medium configured to receive the information related to the amount force applied and to provide feedback to a user about the force applied.

13. The system of claim 12 further comprising a printed circuit on which the sensor is disposed.

14. The system of claim 12 wherein the sensor comprises one selected from a group consisting of a photoelectric sensor, photointerrupter, force-sensitive resistor, force sensing linear potentiometer, a piezoresistive element, piezoelectric element, Velostat®, strain gauge, matrix of mechanical actuators, optical fibers, and sensors using changes in resistance due to applied force.

15. The system of claim 14 wherein the photointerrupter is configured to detect a distance between the touchpoint and the photointerrupter.

16. The system of claim 12 wherein the sensor comprises a pair of conductive pads on either side of a dielectric.

17. The system of claim 12 further comprising a sensing array positioned on a back side of a neck of the stringed musical instrument.

18. The system of claim 12 further comprising additional sensors to monitor temperature and humidity.

* * * * *